Sept. 11, 1956    J. A. FINGERETT ET AL    2,762,969
MAGNETIC PHASE AND AMPLITUDE CONTROLLER
Filed March 23, 1954
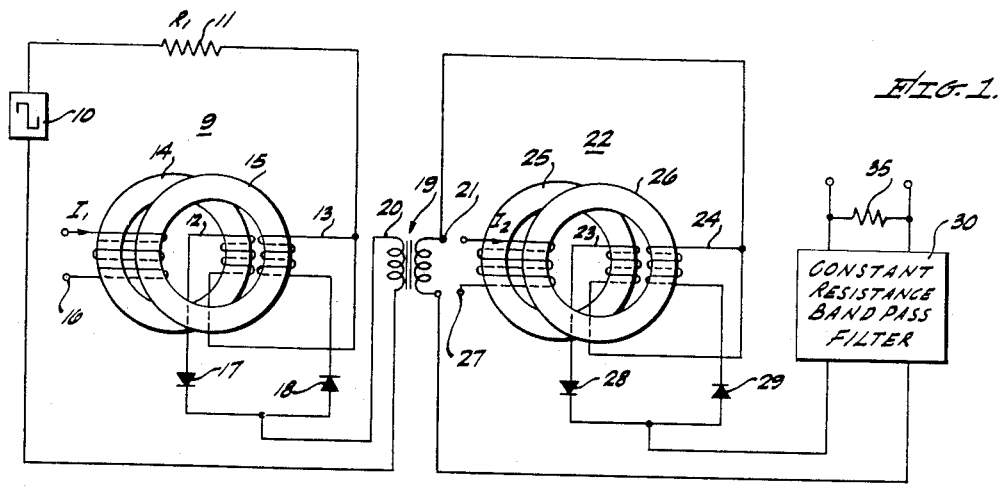
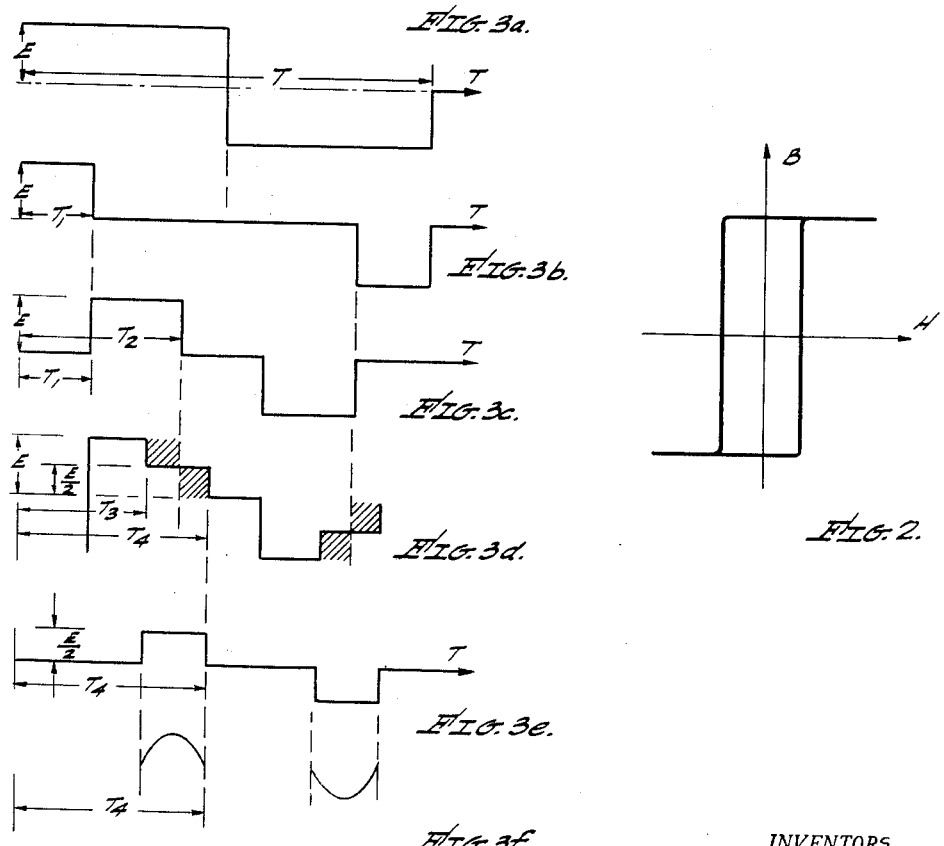
INVENTORS
JOSEPH A. FINGERETT,
JOHN E. RICHARDSON,
BY
Henry Heyman
HIS ATTORNEY.

United States Patent Office 2,762,969
Patented Sept. 11, 1956

2,762,969

MAGNETIC PHASE AND AMPLITUDE CONTROLLER

Joseph A. Fingerett, Pacoima, and John E. Richardson, Los Angeles, Calif., assignors to Hughes Aircraft Company, Culver City, Calif., a corporation of Delaware Application March 23, 1954, Serial No. 418,246

8 Claims. (Cl. 323—89)

This invention relates to circuits for converting direct current electrical quantity into representative alternating current electrical quantities and more particularly it relates to a system for converting a direct current quantity into an alternating waveform whose amplitude is representative of the direct current quantity and whose phase bears a fixed relationship to a timing waveform.

Physical quantities, such as a distance between two objects, may enter a computer in the form of direct current signals. Certain mathematical operations, such as a multiplication, division, etc., must be performed upon these signals to obtain the desired computation. To most conveniently perform the necessary mathematical operations, it is necessary to convert the direct current quantities into representative alternating current quantities. The device which accomplishes this desired result must be extremely stable so that the amplitude of the alternating current quantity will always be representative of the amplitude of the direct current quantity. Further, it must be capable of accurately controlling the phase of the resultant alternating voltage within a few hundredths of a degree with respect to a reference waveform.

It is therefore an object of this invention to convert a direct current quantity into a representative alternating current waveform.

Another object of this invention is to produce an alternating current waveform whose phase is adjustable with respect to a timing waveform and whose amplitude is controlled by a direct current signal.

A further object of this invention is to provide a system of the above-mentioned type which will amplify with extreme stability weak direct current signals.

A still further object of this invention is to provide a system as heretofore stated containing an amplifier which can accurately control the phase of the resultant representative alternating voltage.

Other objects of the invention will be apparent from the following description taken in conjunction with the accompanying drawings made a part of this specification. In the drawings:

Fig. 1 is a schematic diagram showing a preferred embodiment of the invention;

Fig. 2 is a graph showing the magnetization curve of the saturable core reactors used in the practice of the invention;

Fig. 3 (a to f) is a graph useful in the explanation of the operation of the arrangement shown in Fig. 1.

Referring to Fig. 1, a source of alternating current 10 is provided, which current is operated upon by apparatus, the function of which will later become apparent, for translating a direct current quantity, indicated by $I_2$, into an alternating waveform having the same frequency as the source 10 and bearing a phase relationship relative thereto which is selectively adjustable.

To provide a high gain amplifier with stable performance characteristics for the phase control section of the system, a saturable core reactor 9 containing the following elements is employed: two saturable cores 14 and 15, preferably of toroidal shape, are provided with a phase control winding 16 and a pair of controlled windings 12 and 13. The control winding is wound about both cores so that the impedance of both cores will be a function of the controlling direct current $I_1$. The controlled windings are wound separately on each core.

For the purposes of this invention the cores must have a substantially rectangular hysteresis loop. Such cores are composed of a metallic material, preferably of iron-nickel composition. The compositions found to have the most desirable rectangular hysteresis loop are those having a nickel to iron percentage of between 45% to 50%, 65% to 68%, and 80%. These materials when processed in accordance with annealing procedures well-known in the art have a substantially rectangular shaped hysteresis curve. For example, an alloy of 65% nickel 35% iron, after annealing in a magnetic field has an almost perfect rectangularly shaped hysteresis loop. Further information concerning such magnetic materials is present in vol. 12, No. 10, page 88, of Tele-Tech Magazine published by Caldwell-Clements, Inc., New York, N. Y.

The cores utilized in the present invention are preferably shaped in the form of a toroid so as to offer a low reluctance path to the magnetic lines of flux and to eliminate exterior fields. The controlled reactor windings are provided with rectifiers 17 and 18 connected in series with each winding. The polarities of the rectifiers are oppositely arranged so that the positive half-wave of the impressed current flows through one controlled winding and the negative half-wave of the impressed current flows through the other controlled winding. The two reactors with their respective rectifiers are connected in parallel with the rectifiers oppositely poled so that each reactor of the network carries current in one direction only. For purposes of brevity the parallel-connected saturable core reactors with their associated rectifiers will henceforth be termed the phase control reactor assembly.

The phase control reactor assembly 9 is connected in series with the alternating voltage source 10, a resistance 11 having a value $R_1$, and with the primary 20 of a saturable core transformer 19.

For the purpose of converting a direct current quantity, indicated by $I_2$, into an amplitude characteristic of a waveform having the same frequency as the source 10, a second phase control reactor assembly 22 is provided. This device, for the same reasons as heretofore stated for the first phase control reactor assembly, consists of two toroidal shaped saturable cores 25 and 26. A phase control winding 27 is wound about both cores and a pair of controlled windings 23 and 24 are respectively supported on cores 25 and 26. Each of the controlled reactor windings 23 and 24 is also provided with rectifiers 28 and 29, respectively, connected in series therewith and oppositely poled. The controlled windings with their respective rectifiers are connected in parallel. For brevity, the combination will henceforth be called the amplitude control reactor assembly.

The secondary 21 of the saturable core transformer 19 is connected in series with the amplitude control reactor assembly 22 and a constant resistance bandpass filter 30. The constant resistance bandpass filter serves two purposes: it enables the selection of the desired output waveform of the system and, secondly, it presents a constant resistance to desirable frequencies, thereby preventing distortion of the voltage impressed upon it. The constant resistance bandpass filter 30 is of a well-known type, such as that described as the "Bridged T" on page 245 of the Radio Engineers Handbook, first edition, by Tearman and published by McGraw-Hill, New York, It is designed to appear as a resistive load, represented by resistor 35, having a value of $$\frac{R_1}{n^2}$$

where $n$ is the ratio of the number of turns between the primary and secondary of the saturable core transformer 19. This is done for the purpose of reflecting a resistance equal to $R_1$ across the primary of the saturable core transformer. By using a filter having this value of resistance the amplitude control saturable core reactor assembly is prevented, in a manner later to be explained, from producing a phase shift in the voltage across it.

To facilitate the explanation of the operation of the invention, the voltage source 10 is preferably a generator producing an alternating voltage of amplitude E, as shown in Fig. 3a. Initially, the cores of the phase control reactor assembly are unsaturated, hence the impedance of the controlled windings are very high, and they therefore repress or buck most of the generator voltage. The waveform of the voltage across the phase control reactor assembly is shown in Fig. 3b. Very little of the generator voltage is impressed across the primary 20 of the saturable core transformer 19 during that interval of time in which the phase control reactor assembly is unsaturated. This is because the primary of transformer 19 presents a very low impedance to the circuit compared to the impedance of the phase control reactor assembly in the unsaturated state. Resistor $R_1$ is provided for a purpose later to become apparent. It is designed to have a value of resistance which is small in comparison with the impedance of the phase control reactor assembly in its unsaturated state. The net effect is that, initially, most of the generator voltage is across the phase control reactor assembly.

At some later time in the generator voltage cycle, designated as $T_1$, as shown in Fig. 3b, the phase control reactor assembly saturates. Its impedance drops immediately to a very low value, hereinafter referred to as zero because of its rectangular hysteresis characteristic. The voltage across it drops quickly to zero. The time at which saturation occurs is determined by the magnitude of control current $I_1$ through the control winding of the phase control reactor assembly 9.

Once the phase control reactor saturates, the generator voltage appears across the primary of the transformer. Transformer 19 is designed to require a magnitude of current for saturation which is considerably in excess of the magnitude of saturation current of reactor assembly 9. After saturation of reactor assembly 9, and with amplitude control reactor 22 unsaturated, nearly all the generator voltage appears across the primary of the saturable core transformer so designed that it has a high impedance compared to that of the resistor $R_1$ when the secondary is open circuited. The voltage across the primary at time $T_1$ is shown in Fig. 3c.

The voltage induced by the primary across the secondary 21 of transformer 19 is impressed on the amplitude control reactor assembly 22 in series with the bandpass filter 30 and load resistor 35. The time duration of the voltage repressed by the amplitude control reactor is determined by the signal current $I_2$. As long as the amplitude control reactor is not saturated the secondary of the transformer sees an open circuit at all times during the alternating voltage cycle. Further, under the same assumed conditions, at some time $T_2$, the saturable core transformer saturates, its impedance drops to almost zero, thereby leaving only resistor 11 to absorb the voltage impressed on the circuit. The waveform across the primary under these conditions is shown in Fig. 3c. However, according to the invention, the amplitude control reactor is designed to saturate prior to the instant of saturation in the saturable core transformer. Thus, at time $T_3$, as shown in Fig. 3d, the amplitude control reactor saturates, its impedance drops to almost zero, effectively placing the constant resistance bandpass filter, represented by resistor 35, across the secondary of the transformer.

Since filter 30 appears as a resistance of $$\frac{R_1}{n_2}$$

a resistance will be reflected across the primary of the transformer with a reflected value equal to resistor $R_1$. This causes the voltage across the primary to drop in amplitude to one-half the magnitude of the voltage which existed just before the amplitude control reactor saturated. Thus, at time $T_3$, as shown in Fig. 3d, one-half the generator voltage appears across the resistor $R_1$ and the other half across the primary of the transformer, the latter voltage also appearing across the input to the filter (assuming a 1:1 ratio transformer). Fig. 3d illustrates the phase and amplitude of the voltage across the input of the filter under these conditions.

Because the voltage across the primary decreased, the time interval before saturation can ensue in the amplitude control reactor assembly is increased. The increase in time is such that the voltage-time area under the curve shown in Fig. 3d is equal to the voltage-time area under the voltage curve of Fig. 3c. Thus, at a definite later time $T_4$, as shown in Fig. 3d, the saturable core transformer saturates and the impedance of the primary drops to zero. The voltage to the input of the filter drops to zero. The entire generator voltage now appears across the resistor $R_1$ until the generator voltage drops to zero and the next half cycle is initiated.

A filter is employed if a particular output waveform is desired. Thus, in the instant case a waveform, as shown in Fig. 3f, with the source frequency is desired because it simplifies the design of other systems, connected to but not a part of this invention. The filter, therefore, is designed to eliminate harmonics by passing only the fundamental frequency component of the rectangular wave, shown in Fig. 3e. A constant resistance type filter is employed to minimize distortion of the voltage waveform impressed across the filter.

The duration and phase of the waveform appearing at the input to the filter determines the amplitude and phase respectively of the approximately sinusoidal output waveform. Since the phase of the output wave voltage is dependent on when the generator voltage appears across the primary of transformer 19, which in turn is determined by when the phase control reactor saturates, the control current $I_1$ controls the phase of the output wave with respect to a selected fixed reference wave. The present invention enables the phase to be controlled within $3/100$ of a degree with respect to said reference wave. Since the amplitude of the output sine wave from the filter is dependent on the voltage-time area of the input waveform, which in turn is dependent on when the amplitude control reactor saturates, the signal current $I_2$ controls the amplitude of the output sinusoidal voltage.

The explanation of operation of one embodiment of the device set forth supra has assumed that the control current $I_1$ in the control winding 16 of the phase control reactor assembly 9 was selected to produce a predetermined fixed phase shift with respect to the timing waveform. However, a unidirectional signal of varying amplitude may be impressed across control winding 16 to vary the phase shift of the output alternating waveform. This varying unidirectional signal in turn may be indicative of three quantities, one quantity represented by the amplitude of said signal, another by its frequency of variation, and the last by the D.-C. voltage level with respect to some reference, i. e., ground, about which the signal varies in amplitude. Thus, assuming $I_1$ represents a direct current signal of varying amplitude, the phase of the output waveform with respect to some reference period will be directly proportional to the amplitude of said signal. The frequency of the phase shift with respect to the source period will be directly proportional to the frequency of the varying direct current signal. Lastly, the steady state phase shift, that is the phase shift when no direct current signal or varying amplitude appears across the control winding, is representative of the D.-C. voltage level about which the signal varies.

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

What is claimed as new is:

1. A phase and amplitude controlling device comprising: a source of alternating voltage; a first resistor; a saturable core transformer having input terminals and output terminals; a first saturable core reactor having a control winding and a controlled winding; said first reactor controlled winding, said first resistor, said source of alternating voltage and said transformer input terminals all being serially connected in a closed circuit; means for applying a first control voltage to said first saturable core control winding; a second saturable core reactor having a control winding and a controlled winding; said second reactor controlled winding being serially connected with one of said transformer output terminals; and means for applying a second control voltage to said second inductive device control winding; whereby an output alternating voltage is developed between the other transformer output terminal and said second reactor controlled winding whose phase is controlled by the first control voltage and whose amplitude is controlled by the second control voltage.

2. A phase and amplitude controlling device comprising: a source of alternating voltage; a first resistor; a saturable core transformer having input terminals and output terminals; rectifier; a first saturable core reactor having a control winding and a controlled winding; a first rectifier connected to said first reactor controlled winding; said first reactor controlled winding, and first rectifier, said first resistor, said source of alternating voltage, and said transformer input terminals all being serially connected in a closed circuit; means for applying a first control voltage to said first reactor control winding; a second saturable core reactor having a control winding and a controlled winding; a second rectifier connected to said second reactor controlled winding in a manner so as to cause current to flow during the same half cycle when current flows through said first reactor controlled winding; said second reactor controlled winding and said second rectifier and one of said transformer output terminals all being serially connected; and means for applying a second control voltage to said second reactor control winding, whereby an output alternating voltage is produced between the other transformer output terminal and said second reactor controlled winding whose phase is controlled by the first control voltage and whose amplitude is controlled by the second control voltage.

3. A phase and amplitude controlling device comprising: a source of alternating voltage; a first resistor; a saturable core transformer having input terminals and output terminals; a first saturable core reactor having at least two cores, a control winding for both cores, and separate controlled windings for each core; separate rectifiers connected to each of said first reactor controlled windings; said first reactor controlled windings and their associated rectifiers being connected in parallel with each other so as to cause positive half-waves of current to flow through one controlled winding and negative half-waves of current to flow through the other controlled winding; means for applying a first control voltage to said first reactor control winding; said first reactor paralleled controlled windings and rectifiers, said first resistor, said source of alternating voltage and said transformer input terminals all being serially connected in a closed circuit; a second saturable core reactor having at least two cores, a control winding for both cores, and separate controlled windings for each core; separate rectifiers connected to each of said second reactor controlled windings; said second reactor controlled windings and their associated rectifiers being connected in parallel with each other so as to cause positive half-waves of current to flow through one controlled winding and negative half-waves of current to flow through the other controlled winding; means for applying a second control voltage to said second reactor control winding; said second reactor paralleled controlled windings and rectifiers and one of said transformer output terminals all being serially connected, whereby an alternating output voltage is produced between the other of said transformer output terminals and said second reactor controlled windings whose phase is controlled by the first control voltage and whose amplitude is controlled by the second control voltage.

4. In combination: a source of alternating voltage; a first resistor; a saturable core transformer having input and output terminals; a first saturable core reactor having at least two cores; a control winding for both cores and separate controlled windings for each core; separate rectifiers connected to each of said first reactor controlled windings; said controlled windings and their associated rectifiers being connected in parallel with each other so as to cause positive half-waves of current to flow through one controlled winding and negative half-waves of current to flow through the other controlled winding; said paralleled controlled windings and rectifiers, said first resistor, said alternating voltage source and said transformer input terminals all being serially connected; a constant resistance bandpass filter having input and output terminals; a second saturable core reactor having at least two cores, a control winding for both cores and separate controlled winding for each core; separate rectifiers connected to each of said second reactor controlled windings; said second reactor controlled windings and their associated series rectifiers being connected in parallel with each other so as to cause positive half-waves of current to flow through one controlled winding and negative half-waves of current to flow through the other controlled winding; said paralleled controlled windings and rectifiers, said transformer output terminal and said filter input terminals all being serially connected, whereby an output alternating waveform is produced across said filter output terminals whose phase is controlled by the first control voltage and whose amplitude is controlled by the second control voltage.

5. The combination as defined in claim 4 wherein said filter is designed to appear as a constant resistance across the secondary of said saturable core transformer of a value such that it reflects across the input terminals of said saturable core transformer a resistance substantially equal to that of said first resistor.

6. The combination as defined in claim 4 wherein said cores of said first and said second saturable core reactors have substantially rectangular saturation characteristics; and, said saturable core transformer requires a magnitude of current for saturation which is considerably in excess of the magnitude of saturation current required for said first saturable core reactor.

7. A phase and amplitude controlling device comprising: a source of alternating voltage; a first resistor; a saturable core transformer having primary and secondary windings; a first saturable core reactor having at least two toroidal shaped cores of substantially rectangular saturation characteristics, a control winding for said cores, and separate controlled windings for each core; means for applying a first signal to said first reactor control winding; separate rectifiers connected to each of said controlled windings; said controlled windings and their associated series of rectifiers being connected in parallel with each other so as to cause positive half-waves of current to flow through one controlled winding and negative half-waves of current to flow through the other controlled winding; said paralleled controlled windings and rectifiers, said first resistor, said source of alternating voltage and said transformer primary winding all being serially connected in a closed circuit; a constant resistance filter having input and output terminals; a second saturable core reactor having at least two toroidal shaped cores of substantially rectangular saturation characteristics, a control winding for said cores, and separate controlled windings about each core; means for applying a second signal to said control windings; separate rectifiers connected to each of said second reactor controlled windings; said controlled windings and their associated series rectifiers being connected in parallel with each other so as to cause positive half-waves of current to flow through one controlled winding and negative half-waves of current to flow through the other controlled winding; said paralleled controlled windings and rectifiers, said transformer secondary winding and said filter input terminals all being serially connected, whereby an output alternating waveform is produced across said filter output terminals whose phase is controlled by the first control voltage and whose amplitude is controlled by the second control voltage.

8. The phase and amplitude controlling device defined in claim 7 wherein said filter appears to the secondary of said saturable core transformer as a resistor having a value $$\frac{R}{n^2}$$

where R is the resistance of said first resistor and $n$ is the turns ratio between the primary and secondary of said saturable core transformer.

References Cited in the file of this patent
UNITED STATES PATENTS

| | | |
|---|---|---|
| 2,516,563 | Graves | July 25, 1950 |
| 2,677,796 | Geyger | Mar. 4, 1954 |
| 2,683,843 | Geyger | July 13, 1954 |